US011727096B1

(12) United States Patent
Priya et al.

(10) Patent No.: US 11,727,096 B1
(45) Date of Patent: *Aug. 15, 2023

(54) USER INTERFACE COMPETENCE BASED AUTHENTICATION

(71) Applicant: Wells Fargo Bank, N.A., San Francisco, CA (US)

(72) Inventors: Bindu Priya, Hyderabad (IN); Chloe D. Cangardel, Boston, MA (US); Tarini Gupta, Hyderabad (IN); Asher Akunoori, Hyderabad (IN); Inderjeet Singh Khamba, Hyderabad (IN); Kiran Kumar Dhondi Kubeer, Hyderabad (IN); Sreedhar Thunuguntla, Hyderabad (IN); Mohan Kumar Gajula, Hyderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 55 days.

This patent is subject to a terminal disclaimer.

(21) Appl. No.: 17/185,561

(22) Filed: Feb. 25, 2021

Related U.S. Application Data

(63) Continuation of application No. 15/861,315, filed on Jan. 3, 2018, now Pat. No. 10,922,391.

(51) Int. Cl.
*G06F 21/31* (2013.01)
*G06F 21/32* (2013.01)
*G06F 21/52* (2013.01)

(52) U.S. Cl.
CPC ............ *G06F 21/316* (2013.01); *G06F 21/32* (2013.01); *G06F 21/52* (2013.01)

(58) Field of Classification Search
None
See application file for complete search history.

(56) References Cited

U.S. PATENT DOCUMENTS

| 7,620,894 | B1* | 11/2009 | Kahn ................. G06F 3/04895 715/708 |
| 9,639,677 | B1* | 5/2017 | O'Malley ............... G06F 21/31 |
| 2010/0113073 | A1* | 5/2010 | Schlesener ........ H04M 1/72436 455/466 |
| 2015/0261948 | A1* | 9/2015 | Marra ................. H04L 63/0853 726/4 |
| 2018/0160309 | A1* | 6/2018 | Turgeman ............... G06F 21/31 |

* cited by examiner

*Primary Examiner* — Joseph P Hirl
*Assistant Examiner* — Hassan Saadoun
(74) *Attorney, Agent, or Firm* — Kilpatrick Townsend & Stockton LLP

(57) ABSTRACT

The innovation disclosed and claimed herein, in one aspect thereof, comprises systems and methods of user interface competence adaptation and fraud detection. The innovation includes a user device that provides a user interface to receive user interactions. A monitoring component monitors user interactions by the user on the user device. The user interactions can be controlling, navigating, or inputting to the user interface. A determination component determines a user proficiency based on the monitored user interactions. A configurator determines and implements a device configuration for the user device based on the determined user proficiency. A security component determines a different user is accessing the user device based on a change in user proficiency exceeding a threshold change. The security component implements security measures upon determine a different user has access.

16 Claims, 6 Drawing Sheets

USER INTERFACE COMPETENCE BASED AUTHENTICATION

CROSS-REFERENCE TO RELATED APPLICATIONS

This application claims the benefit of U.S. patent application Ser. No. 15/861,315, entitled "USER INTERFACE COMPETENCE BASED AUTHENTICATION" filed on Jan. 3, 2018. The entirety of the above-noted application is incorporated by reference herein.

BACKGROUND

Ease of manipulating devices and/or applications is a constant priority for designers. However, it is difficult to determine a single user experience that appeals to all users. User competencies vary greatly depending on familiarity, age, experience, and/or the like. It is beneficial to alter the user experience according to each user's competency with the device and/or application.

Further, authenticating users is an important process for many businesses. However, confirming user identities to gain access to a device usually stops after a user has been authenticated at an initial step. This can be problematic as most device authentications are sometimes reliant on a simple username/password combination that are known by the user and stored by an authenticating entity. The passwords are easily guessed, stolen, or otherwise compromised. Routine or periodically authenticating can affect the user experience with devices and may discourage use of the device or application. Performing a continuous user-passive authentication after a user has been authenticated can be useful for security purposes.

BRIEF SUMMARY OF THE DESCRIPTION

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises systems and methods of user competence based adaptation and fraud detection. A method of the innovation includes providing a user interface on the user device, wherein the user interface provides an interactive experience for a user. The method includes monitoring at least one user interaction by the user on the user device, the at least one user interaction is one of controlling, navigating within, or inputting to the user interface on the user device. The method includes determining a user proficiency based on the at least one monitored user interaction and determining a device configuration based on the user proficiency.

A system of the innovation can include a user device that provides a user interface to receive user interactions. The system includes a monitoring component that monitors at least one user interaction by the user on the user device, the at least one user interaction is one of controlling, navigating, or inputting to the user interface on the user device. The system includes a determination component that determines a user proficiency based on the at least one monitored user interaction and a configurator that determines a device configuration based on the user proficiency.

A computer readable medium of the innovation has instructions to control one or more processors configured to continuously monitor user interactions with a user interface on a user device. The instructions determine a tracking user proficiency according to the user interactions. The instructions detect a change in the tracking user proficiency greater than a threshold change in user proficiency, and implement security measures for the user device.

In aspects, the subject innovation provides substantial benefits in terms of competence adapting and fraud detection. One advantage resides in an ongoing knowledge of the identity of a user. Another advantage resides in tailoring the user interface according to the capability of each individual user.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

Figure 1:
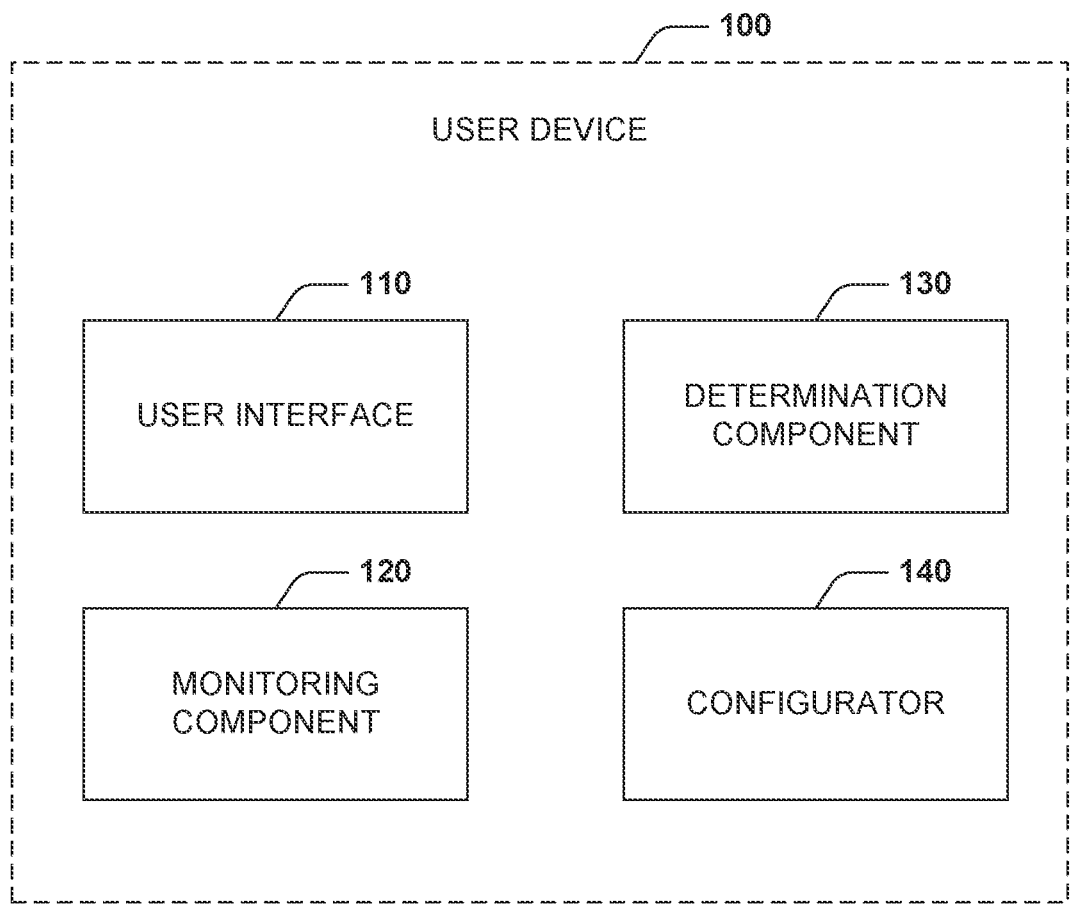
FIG. 1 illustrates an example component diagram of a user device.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

While certain ways of displaying information to users are shown and described with respect to certain figures as screenshots, those skilled in the relevant art will recognize that various other alternatives can be employed. The terms "screen," "web page," "screenshot," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

FIG. 1 illustrates an example component diagram of a user device 100. The user device 100 can be a mobile device, cell phone, tablet, personal computer, smartwatch, automated teller machine, and/or the like. The user device 100 can run applications ("apps) locally or can access components and/or applications remotely. The user device 100 includes a user interface 110 that provides an interactive experience for a user. In some embodiments, the user interface 110 is a touchscreen that can receive inputs. In other embodiments, the user interface 110 is a keyboard, mouse, track pad, and/or the like to receive inputs from a user. In some embodiments, the user interface 110 provides a display to show information and/or graphics to the user. The user interface 110 can be configured and/or changed to be more or less complicated. For example, the user interface 110 can display text in different sizes depending on the user preference and/or abilities. As another example, the user interface 110 can be changed for available applications, location of applications, settings, mode of receiving inputs, and/or the like according a user proficiency.

The user device 100 includes a monitoring component 120 that monitors user interactions by the user on the user device 110. The user interactions can be controlling, navigating within, and/or inputting to the user interface 110 on the user device 100. The monitoring component 120 records the user interactions to facilitate determining a user's proficiency at using the user interface. In some embodiments, the monitoring component 120 continuously monitors the user interactions to determination of a user proficiency as described below.

The user device 100 includes a determination component 130 that determines a user proficiency based on the user interactions captured by the monitoring component 120. In some embodiments, the user proficiency is a score, grade, or level determined by the determination component 130. The determination component 130 receives the user interactions from the monitoring component 120.

The determination component 130 analyzes the user interactions for factors indicative of the user proficiency. The factors can be speed of movement within the user interface 110, typing speed, data entry, selections, time between selections, amount of times a help menu or assistance is used, and/or the like.

In some embodiments, the determination component 130 analyzes each factor independently and then combines the analysis into a user proficiency. For example, a user interaction that has a high speed of movement is indicative of a high user proficiency. The determination component 130 analyzes a high speed of movement and translates it to a high user proficiency.

The determination component 130 aggregates the analysis of each factor into a user proficiency associated with the user. The determination component 130 can normalize the analysis of each factor and then average, or weighted average each factor into an overall user proficiency.

The user device 100 includes a configurator 140 that determines a device configuration for the user device 100 based on the user proficiency. The configurator 130 determines whether the user interface 110 is adapted for the user according to the user proficiency or user's ability to use the user interface 110. The configurator 130 changes the user interface 110 to match the user proficiency. For example, for a high user proficiency, the configurator 130 makes extra features available to the user such as extra input options (e.g. swipe keyboard text input) or extra available applications. For a low user proficiency, the configurator 140 simplifies the user interface 110 such as limiting input options to only keyboard input.

In some embodiments, the monitoring component 120 continuously monitors the user and user interactions with the user interface 110. The determination component 130 can determine a tracking user proficiency that is updated in real time or near real time, or periodically.

The configurator 140 can change the user interface 110 according to the tracking user proficiency to correct for learning curves. For example, a user obtains a user device 100 and starts with a low user proficiency. As time goes on, the user proficiency raises as the user becomes more familiar with the user device 100 and the user interface 110. The configurator 140 can adapt the user interface 110 to match the user proficiency as it raises or lowers.

In some embodiments, the determination component 130 can detect a large change in user proficiency. The determination component 130 can continuously receive user interactions from the monitoring component 120 and determine the tracking user proficiency as described above. The determination component 130 compares a previous user proficiency or an average user proficiency to the tracking user proficiency. If the difference is greater than a predetermined threshold difference, the determination component 130 can determine that a fraudulent user has taken control of the user device 100. In some embodiments, the determination component 130 can plot the tracking user proficiency and determine a slope or instant change in user proficiency to determine a fraudulent user is accessing the user device 100.

The determination component 130 can implement security measures on the user device 100 based on the determination that a fraudulent user is controlling the user device 100. For example, the determination component 130 can restrict access or lock the user device 100 to prevent further user interactions until verifying the user's identity. In some embodiments, the determination component 130 can require the user to authenticate their identity. In some embodiments, the authentication can be on the user device 100 by requiring re-entering login credentials. In other embodiments, the determination component can request the user authenticate their identity on a secondary user account outside of the user device 100 such as 2-factor authentication to an email, mobile device, or other form of communication. The 2-factor authentication can include generating a one-time passcode sent to the other form of communication that is known to the user, where the one-time passcode can be entered into the user device 100 to confirm the user's identity to maintain access to the user device 100.

Figure 2:
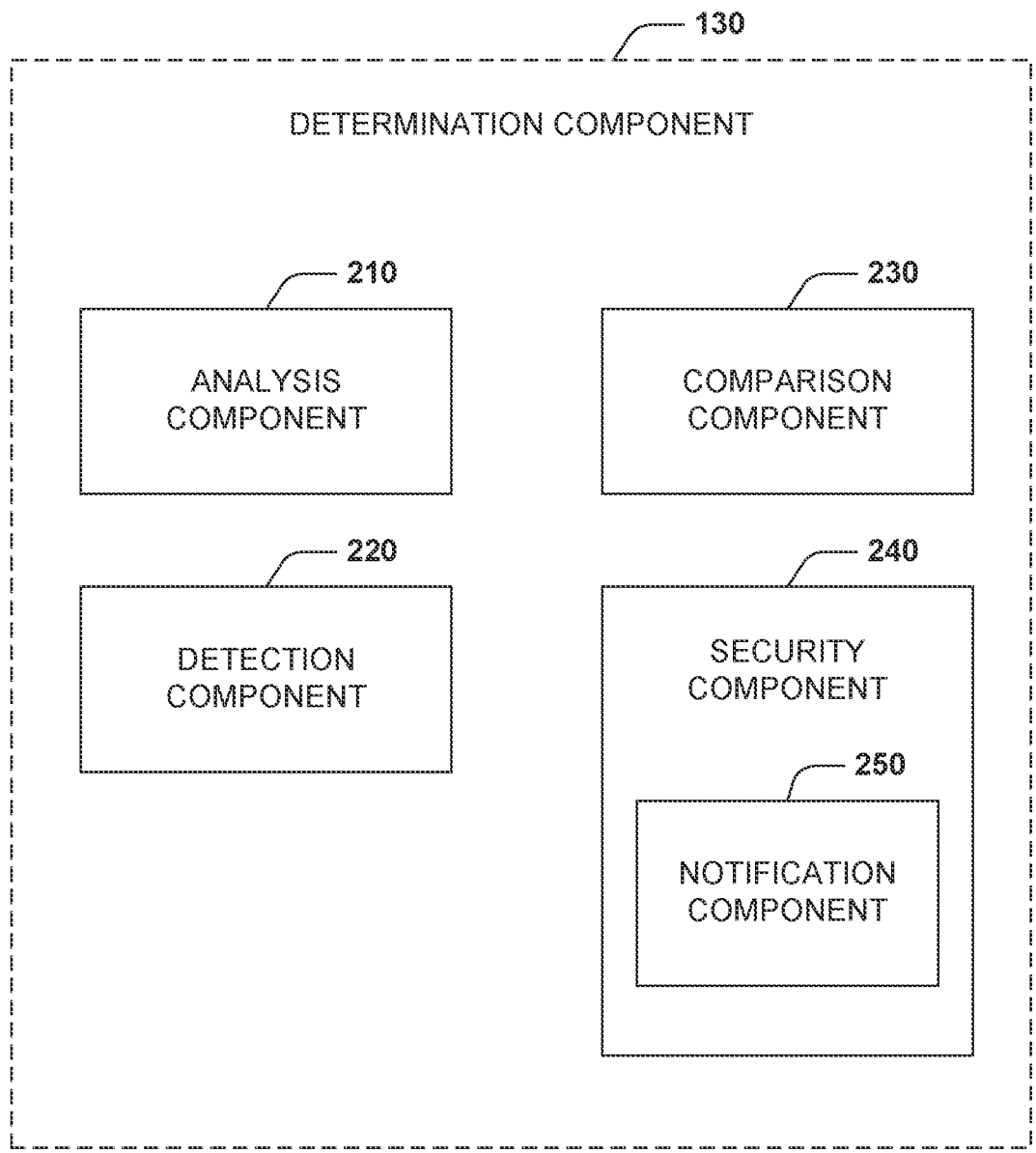
FIG. 2 illustrates an example component diagram of a determination component.

FIG. 2 illustrates an example component diagram of a determination component. The determination component 130 includes an analysis component 210 that determines a user proficiency based on the user interactions captured by the monitoring component 120. In some embodiments, the user proficiency is a score, grade, or level determined by the analysis component 210. The analysis component 210 receives the user interactions from the monitoring component 120.

The analysis component 210 analyzes the user interactions for factors indicative of the user proficiency. The factors can include: speed of movement within the user interface 110, typing speed, data entry, selections, time between selections, amount of times a help menu or assistance is used, scrolling rate, number of pages navigated, number of mistakes or cancelled events recorded, number of customer support calls, number of retries, direction of mouse path, and/or the like.

The analysis component 210 analyzes each factor independently and then combines the analysis into a user proficiency. For example, a user interaction that has a fast scrolling rate is indicative of a high user proficiency. The analysis component 210 analyzes a high scrolling rate and translates it to a high user proficiency to be factored into the user proficiency.

The analysis component 210 aggregates the analysis of each factor into a user proficiency associated with the user. The analysis component 210 can normalize the analysis of each factor and then average, or weighted average each factor into an overall user proficiency to be used by the configurator 140 as described above.

In some embodiments, the determination component 130 includes a detection component 220 that detects changes in user proficiency. The analysis component 210 can continuously receive user interactions from the monitoring component 120 and determine the tracking user proficiency as described above.

The determination component 130 includes a comparison component 230 that compares a previous user proficiency or an average user proficiency to the tracking user proficiency. If the difference is greater than a predetermined threshold difference, a security component 240 can determine that a fraudulent user may be using the user device 100. In some embodiments, the detection component 220 can plot the tracking user proficiency and determine a slope or instant change in user proficiency to determine a different user is accessing the user device 100.

The security component 240 implements security measures on the user device 100 based on determining that a different user is controlling the user device 100. The security component 240 can restrict access to the user device 100 upon determining a fraudulent user. The security component 240 can require the user to authenticate their identity. In some embodiments, the authentication can be on the user device 100 by requiring re-entering login credentials.

In other embodiments, the security component 240 requests the user authenticate themselves on a secondary account of the user such as 2-factor authentication to an email, mobile device, or other form of communication. The security component 240 generates a one-time passcode sent to the other form of communication that is known to only the user and the user device, where the one-time passcode can be entered into the user device 100 to prove the user's identity to maintain access to the user device 100. The security component 240 includes a notification component 250 that generates an alert to the user to confirm the authentication to provide access to the user device. The notification component 250 includes the one-time passcode in the alert and the alert is communicated to the user on the secondary user account.

In some embodiments, the security component 240 can request biometric verification of the user's identity. In other embodiments, the security component 240 can access a server to access user account data for verification of the user identity.

Figure 3:
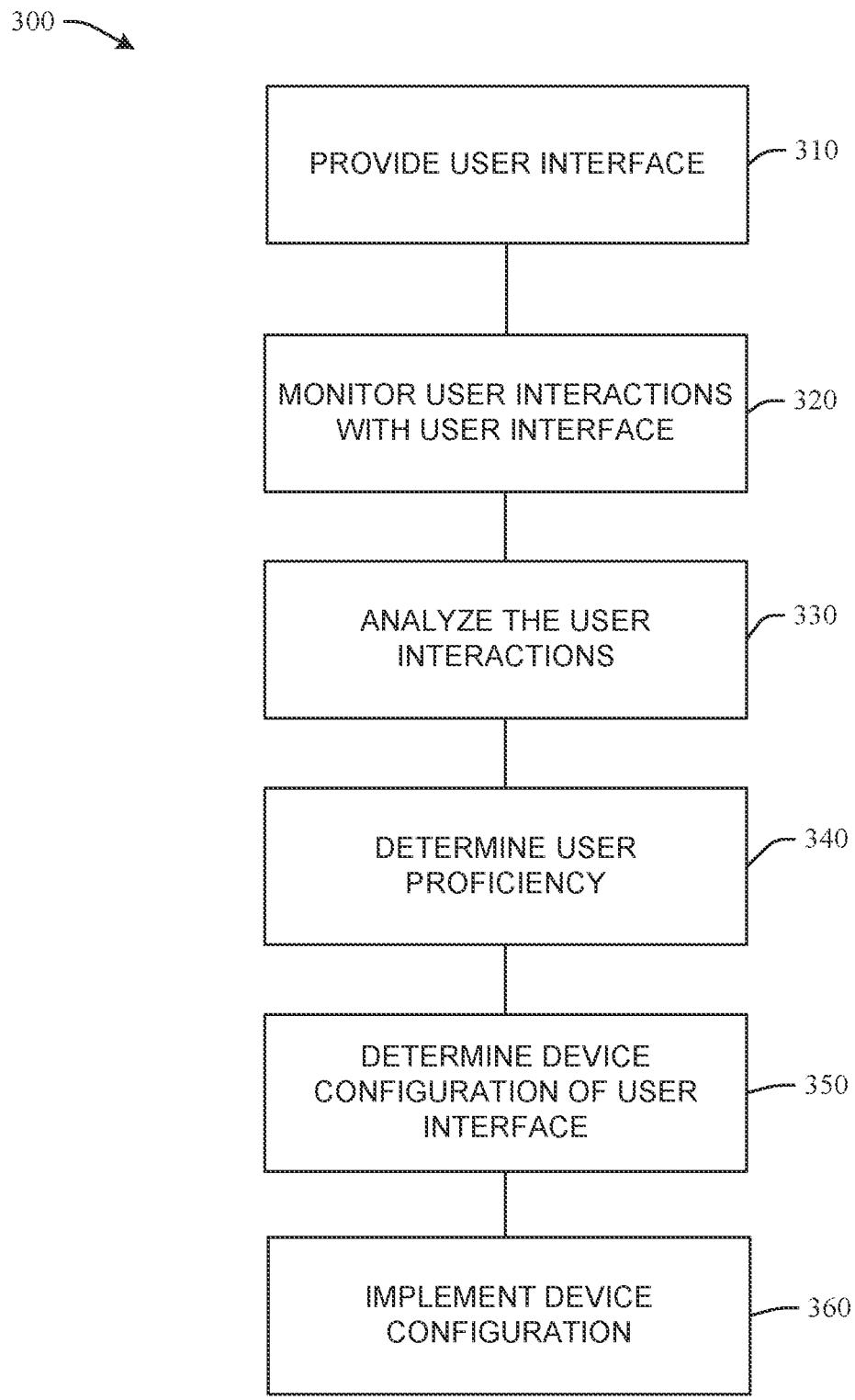
FIG. 3 illustrates a method for competency based user interfaces.
Figure 4:
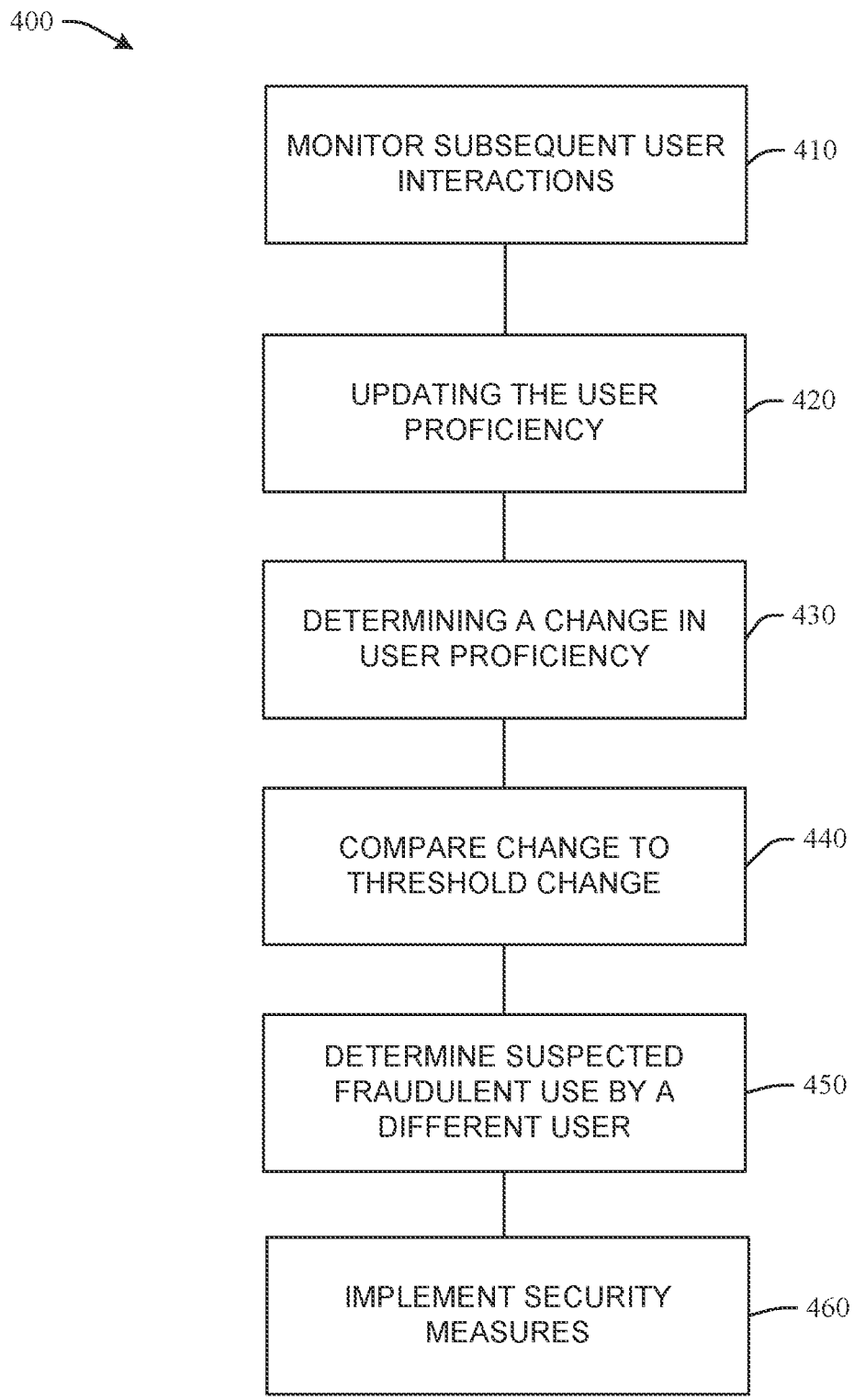
FIG. 4 illustrates a method of competency based fraud detection.

With reference to FIG. 3 and FIG. 4, example methods 300 and 400 are depicted for authenticating a user to verify identity. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. It is also appreciated that the methods 300 and 400 are described in conjunction with a specific example is for explanation purposes.

FIG. 3 illustrates a method for competency based user interfaces. At 310, a user interface on a user device is provided to a user. The user interface provides an interactive experience for a user to control the user device. In some embodiments, the user device does not provide the user interface until authenticating the user's identity and right to access the user device as an initial step. At 320, user interactions with the user interface are monitored and/or recorded. In some embodiments, the user interactions can one of controlling, navigating within, or inputting to the user interface on the user device.

At 330, the user interactions are analyzed for factors indicative of a user proficiency. The factors can include: speed of movement within the user interface 110, typing speed, data entry, selections, time between selections, amount of times a help menu or assistance is used, scrolling rate, number of pages navigated, number of mistakes or cancelled events recorded, number of customer support calls, number of retries, direction of mouse path, and/or the like.

At 340, a user proficiency is determined based on the monitored user interactions and the analysis of each factor. The user proficiency can be the aggregate, average, or weighted average of the analysis of each factor. At 350, a device configuration is determined for the user device based on the user proficiency. For example, a high user proficiency can determine that a more sophisticated user device configuration for the user device and user interface is to be used.

A low user proficiency can determine a more simplified user interface is to be used. At 350, the device configuration is implemented for the user interface on the user device. The changes to the user interface can affect text size, text replaced with images, augmented reality, customized inputs, complexity of concepts, languages, default options, drop down menu options, order in which options or items are displayed, and/or the like. Each change can be simplified or more sophisticated according to the user proficiency.

FIG. 4 illustrates a method of competency based fraud detection. At 410, user interactions of the user interface are monitored on the user device. At 420, the user proficiency is updated according to the user interactions of the user device. At 430, a change in user proficiency is determined. For example, the user proficiency changes according to different users or increased experience by the authorized user with the user interface.

At 440, the change in user proficiency is compared to a threshold change. At 450, a different user is determined to be accessing the user device based on the change in user proficiency exceeding a threshold change. In the example, large changes in the user proficiency over a short period of time indicate that a change in user has occurred. The different user may not be authorized to access the user device.

At 460, security measures are implemented for the user device. The security measures can be locking or restricting access to the user device upon determining a different user has access. An alert can be generated to the user to confirm the authentication to provide access to the user device. The alert can be sent to a secondary user account to facilitate confirming the access or to warn the user that there is suspected unauthorized use of the user device.

Figure 5:
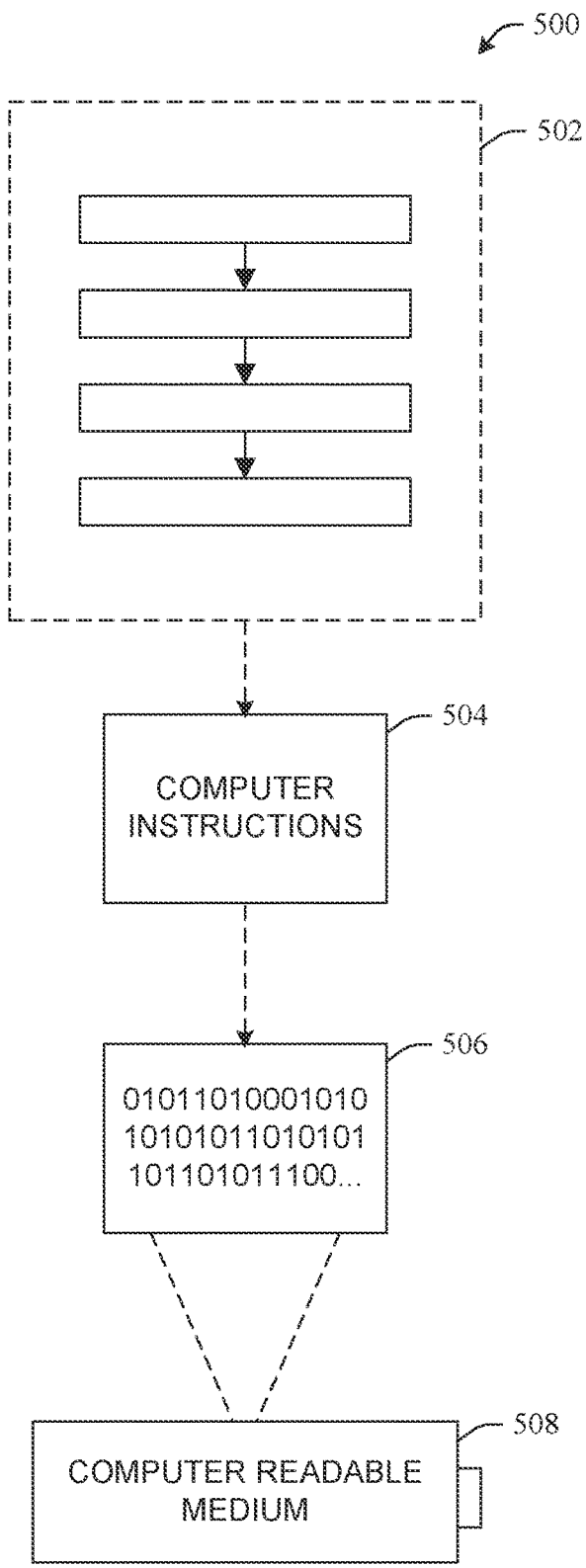
FIG. 5 illustrates a computer-readable medium or computer-readable device comprising processor-executable instructions configured to embody one or more of the provisions set forth herein, according to some embodiments.

Still another embodiment can involve a computer-readable medium comprising processor-executable instructions configured to implement one or more embodiments of the techniques presented herein. An embodiment of a computer-readable medium or a computer-readable device that is devised in these ways is illustrated in FIG. 5, wherein an implementation 500 comprises a computer-readable medium 508, such as a CD-R, DVD-R, flash drive, a platter of a hard disk drive, etc., on which is encoded computer-readable data 506. This computer-readable data 506, such as binary data comprising a plurality of zero's and one's as shown in 506, in turn comprises a set of computer instructions 504 configured to operate according to one or more of the principles set forth herein. In one such embodiment 500, the processor-executable computer instructions 504 is configured to perform a method 502, such as at least a portion of one or more of the methods described in connection with embodiments disclosed herein. In another embodiment, the processor-executable instructions 504 are configured to implement a system, such as at least a portion of one or more of the systems described in connection with embodiments disclosed herein. Many such computer-readable media can be devised by those of ordinary skill in the art that are configured to operate in accordance with the techniques presented herein.

Figure 6:
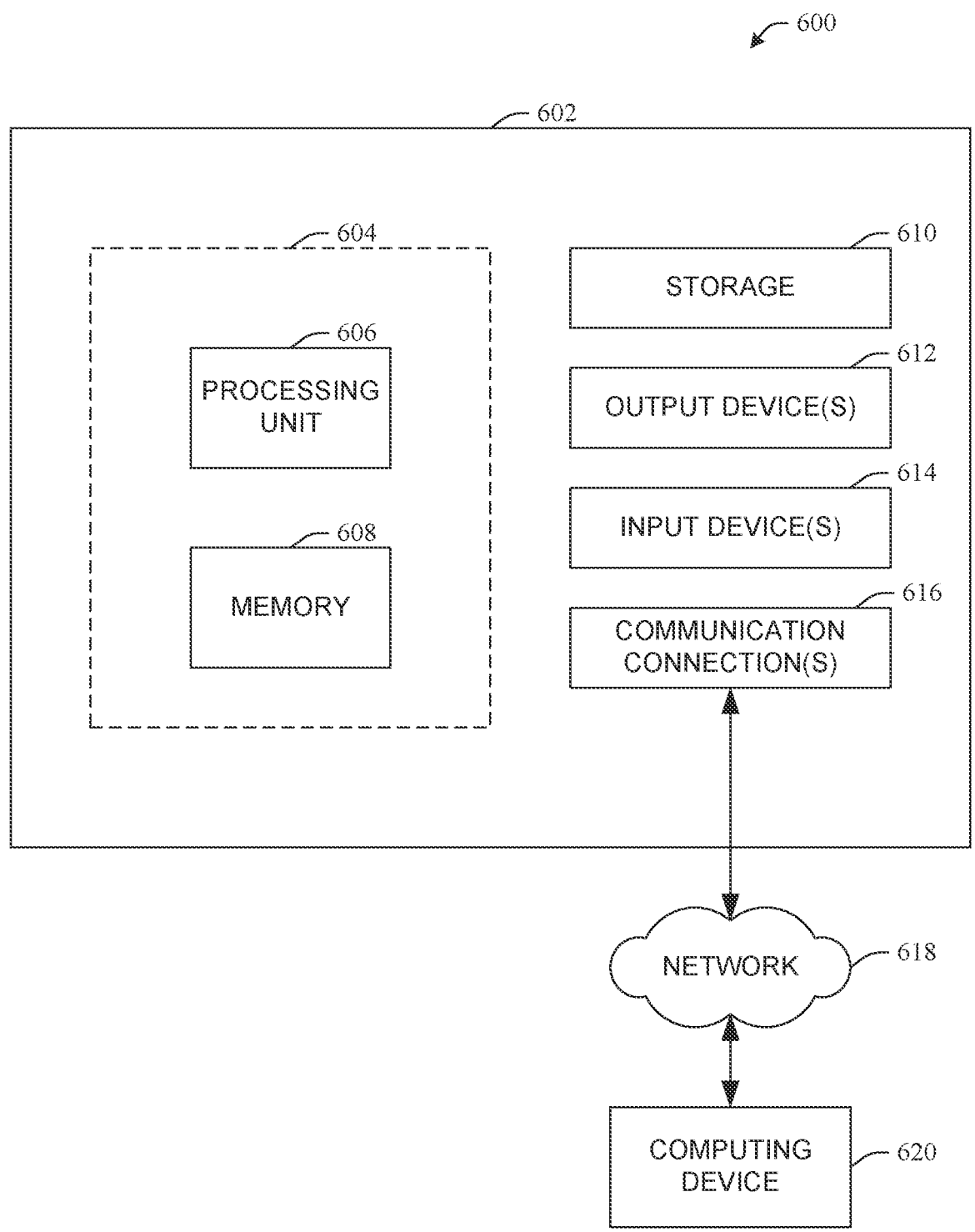
FIG. 6 illustrates a computing environment where one or more of the provisions set forth herein can be implemented, according to some embodiments.

With reference to FIG. 6 and the following discussion provide a description of a suitable computing environment in which embodiments of one or more of the provisions set forth herein can be implemented. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, tablets, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions can be implemented as program modules, such as functions, objects, Application Programming Interfaces (APIs), data structures, and the like, that perform particular tasks or implement particular abstract data types. Typically, the functionality of the computer readable instructions can be combined or distributed as desired in various environments.

FIG. 6 illustrates a system 600 comprising a computing device 602 configured to implement one or more embodiments provided herein. In one configuration, computing device 602 can include at least one processing unit 606 and memory 608. Depending on the exact configuration and type of computing device, memory 608 may be volatile, such as RAM, non-volatile, such as ROM, flash memory, etc., or some combination of the two. This configuration is illustrated in FIG. 6 by dashed line 604.

In these or other embodiments, device 602 can include additional features or functionality. For example, device 602 can also include additional storage such as removable storage or non-removable storage, including, but not limited to, magnetic storage, optical storage, and the like. Such additional storage is illustrated in FIG. 6 by storage 610. In some embodiments, computer readable instructions to implement one or more embodiments provided herein are in storage 610. Storage 610 can also store other computer readable instructions to implement an operating system, an application program, and the like. Computer readable instructions can be accessed in memory 608 for execution by processing unit 606, for example.

The term "computer readable media" as used herein includes computer storage media. Computer storage media includes volatile and nonvolatile, non-transitory, removable and non-removable media implemented in any method or technology for storage of information such as computer readable instructions or other data. Memory 608 and storage 610 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 602. Any such computer storage media can be part of device 602.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 602 can include one or more input devices 614 such as keyboard, mouse, pen, voice input device, touch input device, infrared cameras, video input devices, or any other input device. One or more output devices 612 such as one or more displays, speakers, printers, or any other output device can also be included in device 602. The one or more input devices 614 and/or one or more output devices 612 can be connected to device 602 via a wired connection, wireless connection, or any combination thereof. In some embodiments, one or more input devices or output devices from another computing device can be used as input device(s) 614 or output device(s) 612 for computing device 602. Device 602 can also include one or more communication connections 616 that can facilitate communications with one or more other devices 620 by means of a communications network 618, which can be wired, wireless, or any combination thereof, and can include ad hoc networks, intranets, the Internet, or substantially any other communications network that can allow device 602 to communicate with at least one other computing device 620.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
continuously monitoring for a first user interaction by a user on a user device;
determining a first proficiency based on the first user interaction;
continuously monitoring for a second user interaction on the user device;
determining a second proficiency based on the second user interaction;
determining whether a change between the first proficiency and the second proficiency exceeds a predetermined threshold; and
if the change exceeds a predetermined threshold, requiring the user to enter login credentials.

2. The method of claim 1, wherein determining the first and second proficiency comprises:
analyzing the first user interaction and the second user interaction for one or more of speed of movement, typing speed, data entry, selections, help requests, or time between selections.

3. The method of claim 1, further comprising:
determining a device configuration for the user device based on the first proficiency or the second proficiency.

4. The method of claim 3, wherein the device configuration comprises changes to a user interface provided to the user of the user device such that the user interface matches the first proficiency or the second proficiency.

5. The method of claim 1, further comprising:
determining a fraudulent user is accessing the user device based on the change in the first and second proficiency exceeding the predetermined threshold.

6. The method of claim 5, further comprising:
restricting access to the user device upon determining the fraudulent user has access; and
generating an alert to the user to confirm authentication to provide access to the user device, wherein the alert is communicated to the user on a secondary user account.

7. The method of claim 1,
wherein the change in the first and second proficiency is an increase of user proficiency according to at least one of speed of movement, speed of selections, access to critical files, typing speed, data entry, or time between selections.

8. A system, comprising:
a user device that receives at least one interaction;
a monitoring component that continuously monitors for a first interaction and a second interaction on the user device; and
a determination component that determines a first proficiency and a second proficiency based on the first and second interactions and determines whether a change between the first proficiency and the second proficiency exceeds a predetermined threshold, wherein if the changes exceed a predetermined threshold, the system requires the user to enter login credentials.

9. The system of claim 8, wherein determination component comprises:
an analysis component that analyzes the first and second interaction for one or more of speed of movement, typing speed, data entry, selections, or time between selections.

10. The system of claim 8, further comprising:
a configurator that determines a device configuration for the user device based on the first proficiency or the second proficiency.

11. The system of claim 10, wherein
the configurator implements the device configuration that changes the user interface provided to the user such that the user interface correlates to the first proficiency or the second proficiency.

12. The system of claim 8, wherein the determination component comprises:
a security component that determines a fraudulent user is accessing the user device based on the change in the first and second proficiency exceeding the threshold change.

13. The system of claim 12,
wherein the security component restricts access to the user device upon determining the fraudulent user has access; and
a notification component generates an alert to the user to confirm authentication to provide access to the user device, wherein the alert is communicated to the user on a secondary user account.

14. The system of claim 8, further comprising:
a detection component that determines the change in the first and second proficiency as an increase of proficiency according to at least one of speed of movement, speed of selections, access to critical files, typing speed, data entry, or time between selections.

15. A non-transitory computer readable medium having instructions to control one or more processors configured to:
continuously monitor for a first user interaction by a user on a user device;
determine a first user proficiency based on the first user interaction;
continuously monitor for a second user interaction on the user device;
determine a second proficiency based on the second user interaction;
determine whether a change between the first proficiency and the second proficiency exceeds a predetermined threshold; and if the change exceeds a predetermined threshold, require the user to enter login credentials.

16. The non-transitory computer readable medium of claim 15,
wherein an increase in the first proficiency and second proficiency is an increase of user proficiency according to at least one of speed of movement, speed of selections, access to critical files, typing speed, data entry, or time between selections.

\* \* \* \* \*